(12) United States Patent
Bryant (10) Patent No.: US 7,765,521 B2
(45) Date of Patent: Jul. 27, 2010

(54) CONFIGURATION ENGINE (76) Inventor: Jeffrey F Bryant, 37 Thornton Ferry Rd., Amherst, NH (US) 03031

( * ) Notice: Subject to any disclaimer, the term of this patent is extended or adjusted under 35 U.S.C. 154(b) by 690 days.

(21) Appl. No.: 10/303,268

(22) Filed: Nov. 25, 2002

(65) Prior Publication Data

US 2004/0045001 A1 Mar. 4, 2004

Related U.S. Application Data (63) Continuation-in-part of application No. 10/290,939, filed on Nov. 8, 2002, now abandoned.

(60) Provisional application No. 60/407,555, filed on Aug. 29, 2002, provisional application No. 60/406,853, filed on Aug. 29, 2002.

(51) Int. Cl.
*G06F 9/44* (2006.01)
*G06F 15/16* (2006.01)
*G06F 9/46* (2006.01)

(52) U.S. Cl. ............... 717/103; 717/121; 709/203; 709/220; 718/104; 718/105

(58) Field of Classification Search .......... 717/107, 717/162, 120; 709/219, 220, 203, 226
See application file for complete search history.

(56) References Cited

U.S. PATENT DOCUMENTS

| | | | |
|---|---|---|---|
| 5,877,966 A | 3/1999 | Morris et al. | |
| 5,991,536 A | 11/1999 | Brodsky et al. | |
| 5,995,916 A | 11/1999 | Nixon et al. | |
| 6,083,276 A | * 7/2000 | Davidson et al. | 717/107 |
| 6,195,791 B1 | 2/2001 | Carlson et al. | |
| 6,226,692 B1 | 5/2001 | Miloushev et al. | |
| 6,226,783 B1 | 5/2001 | Limondin et al. | |

(Continued)

FOREIGN PATENT DOCUMENTS

EP 1 246 054 A1 10/2002

(Continued)

OTHER PUBLICATIONS

"Agents Based Load Balancing with Component Distribution Capability", Desic et al., May 2002. Online retrieved at <http://ieeexplore.ieee.org/stamp/stamp.jsp?tp=&arnumber=1540489&isnumber=32898>.*

(Continued)

*Primary Examiner*—Tuan Q Dam
*Assistant Examiner*—Thuy Dao
(74) *Attorney, Agent, or Firm*—Fitch, Even, Tabin & Flannery (57) ABSTRACT

In a distributed computing, object oriented, component based framework, some components may be capable of running some tasks, incapable of running others and capable of running still others, but obtaining only sub-optimal results. Components may already be assigned tasks, and have insufficient capacity remaining to execute additional tasks. A configuration manager seeks to rectify this. The configuration manager gathers information stored in a configuration template associated with each of the components, interrogates the components about their current status and compares the results to a dynamic plan developed by a tasking engine. The configuration engine then assigns tasks to processor managers based on the results obtained by the configuration manager.

26 Claims, 6 Drawing Sheets

U.S. PATENT DOCUMENTS

| | | | |
|---|---|---|---|
| 6,233,610 B1 | 5/2001 | Hayball et al. | |
| 6,247,128 B1* | 6/2001 | Fisher et al. | 713/100 |
| 6,308,314 B1 | 10/2001 | Carlson et al. | |
| 6,336,118 B1 | 1/2002 | Hammond | |
| 6,363,411 B1 | 3/2002 | Dugan et al. | |
| 6,370,682 B1 | 4/2002 | Eckardt et al. | |
| 6,381,656 B1 | 4/2002 | Shankman | |
| 6,405,246 B1 | 6/2002 | Hutchison | |
| 6,421,692 B1 | 7/2002 | Milne et al. | |
| 6,424,991 B1 | 7/2002 | Gish | |
| 6,430,599 B1 | 8/2002 | Baker et al. | |
| 6,513,112 B1* | 1/2003 | Craig et al. | 713/1 |
| 6,687,735 B1* | 2/2004 | Logston et al. | 709/203 |
| 6,721,898 B1 | 4/2004 | Hasha | |
| 6,871,344 B2* | 3/2005 | Grier et al. | 717/162 |
| 6,938,079 B1* | 8/2005 | Anderson et al. | 709/222 |
| 7,043,539 B1* | 5/2006 | Treiber et al. | 709/220 |
| 7,054,931 B1* | 5/2006 | Candan et al. | 709/226 |
| 7,478,337 B2 | 1/2009 | Kodosky et al. | |
| 2001/0034880 A1 | 10/2001 | Dzoba et al. | |
| 2001/0037412 A1 | 11/2001 | Miloushev et al. | |
| 2001/0051971 A1 | 12/2001 | Kato | |
| 2002/0032754 A1* | 3/2002 | Logston et al. | 709/219 |
| 2002/0032768 A1* | 3/2002 | Voskuil | 709/224 |
| 2002/0065958 A1 | 5/2002 | Rocray et al. | |
| 2002/0069400 A1 | 6/2002 | Miloushev et al. | |
| 2002/0087947 A1 | 7/2002 | Kwon et al. | |
| 2002/0104069 A1 | 8/2002 | Gouge et al. | |
| 2002/0120924 A1 | 8/2002 | Miloushev et al. | |
| 2002/0174082 A1 | 11/2002 | Miloushev et al. | |
| 2002/0184348 A1 | 12/2002 | Rapp et al. | |
| 2003/0051008 A1* | 3/2003 | Gorthy et al. | 709/220 |
| 2003/0056200 A1 | 3/2003 | Li et al. | |
| 2003/0056205 A1 | 3/2003 | Miloushev et al. | |
| 2003/0110312 A1 | 6/2003 | Gunduc et al. | |
| 2003/0115298 A1* | 6/2003 | Baker | 709/220 |
| 2003/0131343 A1 | 7/2003 | French et al. | |
| 2003/0144983 A1 | 7/2003 | Bigus et al. | |
| 2003/0208641 A1 | 11/2003 | Wesemann | |
| 2004/0181710 A1 | 9/2004 | Sauer et al. | |

FOREIGN PATENT DOCUMENTS

| | | |
|---|---|---|
| WO | 99/60715 | 11/1999 |
| WO | 00/43846 A2 | 7/2000 |
| WO | WO 01/24003 A1 | 4/2001 |
| WO | WO 02/057886 A2 | 7/2002 |

OTHER PUBLICATIONS

"Cisco CNS Configuration Engine Release 1.3", Nov. 2002. Online retrieved at <http://www.cisco.com/warp/public/cc/pd/nemnsw/2100/prodlit/ltfdt_qp.pdf>.*

"Applying conflict management strategies in BDI agents for resource management in computational grids", Rana et al., Jan. 2002, pp. 205-214. Online retrieved at <http://delivery.acm.org/10.1145/570000/563825/p205-rana.pdf>.*

"Exploiting flexibly assignable work to improve load balance", Pinar et al., Aug. 2002, pp. 155-163. Online retrieved at <http://delivery.acm.org/10.1145/570000/564899/p155-pinar.pdf>.*

"The design and applications of a context service", Lei et al., Oct. 2002, pp. 45-55. Online retrieved at <http://delivery.acm.org/10.1145/650000/643554/p45-lei.pdf>.*

"Managing multi-configuration hardware via dynamic working set analysis", Dhodapkar et al., May 2002, pp. 233-244, <http://delivery.acm.org/10.1145/550000/545241/p233-dhodapkar.pdf>.*

"Monitoring, security, and dynamic configuration with the dynamicTAO reflective ORB", Kon et al., Apr. 2000, pp. 121-143, <http://delivery.acm.org/10.1145/340000/338355/p121-kon.pdf>.*

"Towards efficient resource on-demand in Grid Computing", Yang et al., Apr. 2003, pp. 37-43, <http://delivery.acm.org/10.1145/770000/769787/p37-yang.pdf>.*

Michelena, Nestor et al. A Cobra-Based Object-Oriented Framework for Distributed System Design, Automotive Research Center, College of Engineering, University of Michigan, pp. 1-32.

DCE Distributed Computing Environment, DCE Technology at Work, www.opengroup.org/dce/tech/tech.htm pp. 1-2 printed on Aug. 22, 2002.

Chambers, John et al., Distributed Computing with Data, Lucent Technologies, Bell Labs Innovations, pp. 1-16.

Martin, David L. et al., The Open Agent Architecture: A Framework for Building Distributed Software Systems, www.ai.sri.com/~cheyer/papers/aai/oaa.html , 44 pages, printed on Aug. 22, 2002.

Alshabani, Iyad et al., Toward a Component Framework for Distributed Computing, www.lifl.fr/~alshaban/research/MSA02/ printed on Aug. 22, 2002, 14 pages.

Common Component Architecture Forum, Copyright 2002, 42 pages.

EP Search Report dated Sep. 17, 2007 of Patent Application No. EP 03 77 0250 filed Aug. 22, 2003.

Eyermann, Philip A. et al., "Maturing The Software Communications Architecture For JTRS", IEEE, 2001, pages 158-162.

"Support and Rationale Document for the Software Communications Architecture Specification (v2.2)", Dec. 19, 2001, [online][Retrieved on Jun. 29, 2005] from the internet <URL:htp://jtrs.army.mil/sections/technicalinformation/srd%20v2.2/SRD_Release_V2.2pdf>, 111 pages.

Condor Team, "Condor Version 6.2.2 Manual", University of Wisconsin, Dec. 5, 2001, 387 pages, University of Wisconsin—Madison.

Diakov et al. "Monitoring Extensions for Component-Based Distribution Software", International Conference on Protocols for Multimedia Systems, Oct. 2000, XP002976954, pp. 1-8.

SAS Institute SAS/OR® 9.1 Users Guide: QSIM Application 1999, Internet Citation [retrieved on Apr. 1, 2004], XP002976955, pp. 1-120.

A. Tewari, "Modern Control Design With Matlab and Simulink" Apr. 17, 2002, Wiley, XP002452072, ISBN: 978 0 471 49679 3, chapter 1 (pp. 1-12) & chapter 7 (pp. 323-371).

Diakov et al. "Monitoring of Distributed Component Interactions", 2000, 2 pages.

Diakov et al. "Design and Implementation of a Framework for Monitoring Distrbuted Component Interactions", 2000.

Sztipanovits et al., "Self-Adaptive Software for Signal Processing", 1998, 10 pages.

Ledeczi et al., "Synthesis of Self-Adaptive Software", IEEE, 2000.

NAS, "Self-Configuration and Adaptive Coordination", 2001.

Seltzer et al., "Self-Monitoring and Self-Adapting Operating Systems", Harvard University, 1997.

* cited by examiner

CONFIGURATION ENGINE

RELATED APPLICATIONS

This application claims the benefit of U.S. Provisional Applications No. 60/407,555, filed Aug. 29, 2002, and No. 60/406,853, filed Aug. 29, 2002. In addition, this application is a continuation-in-part of U.S. application Ser. No. 10/290,939, filed Nov. 8, 2002, now abandoned. Each of these applications is herein incorporated in its entirety by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

The present invention relates to software architecture. More particularly to software architecture incorporating configuration engines for the management of multiple processing nodes.

2. Background

The rapid evolution of technology has posed significant problems, as well as benefits. Some technologies never achieve their full potential while others evolve rapidly, leaving earlier versions obsolete shortly after they have been installed. Technologies may need to be frequently substituted or otherwise adapted to compensate for different needs. Software particularly must be made amenable to substitution and adaptation and can be a means of allowing integration of new hardware or allowing existing hardware to fulfill new functions.

Large-scale software development has evolved rapidly from its inception. Through the 1980s large-scale software was developed in modular systems of subsystems. Even today these are the most common systems in use. These systems are largely hardware dependent, problems or errors could be detected down to the level of the subsystem. These systems were based on point solutions where the problem/solution is functionally decomposed into subsystems. Potential reuse of the software for other applications must be anticipated during development and integrated into the software design. Extensions of the software are difficult and can only be achieved when such extensions were anticipated and designed into the system architecture itself.

In the 1990s, some improvement came with the advent of Object Oriented Systems (OOS). Object Oriented Systems were still deficient in a number of respects. OOS are still hardware dependent, they are designed for specific hardware configurations and modules are not productized. Off the shelf components could not be easily integrated in to a software system since each piece of software was developed for a particular hardware platform using different languages. No standard interface was available. These systems were based, like their predecessors, on point solutions. The point solutions for OOS are derived using Object Oriented Analysis. Extension of the system using existing components was difficult as a result of the multiplicity of languages used.

In recent years, research and development has centered on layered or component based systems. In such a system a thin common layer or component base class is used in the development of all software modules. Each of the major capabilities of the system is represented by at least one module or component. These modules or components are thus "wrapped" in the thin common layer. Independent components are developed, tested, and packaged independently of each other, and while operating have no knowledge of their environment, since all input/output is constrained to interface ports connected from the outside. Run time discoverable parameter ports control specific behavior.

Component technology has in recent years become an area of increasing interest given the above challenges. Component technologies such as, CORBA, Common Object Request Broker Architecture (developed in 1997), allow for increased flexibility when implementing business processes. By combining components many different software products can be created from existing modules. This increases the speed and efficiency of software development thereby better meeting client and internal demands and decreasing costs associated with development.

The goal now is to make software components that allow reuse by performing a particular function and providing an appropriate interface with a larger system. Each component should be autonomous regarding its particular functionality. This autonomy would allow changes to be made with individual components without disturbing the configuration of the entire system. Relating the various quasi-autonomous components to each other results in a high degree of complexity in communication and synchronization code.

A system of reusable and flexible components would be especially useful for developers of large and complex software packages, such as military contractors. In the past, software was designed specifically for a contract. When a new contract was bid for, the contractor started from scratch. As discussed above, differences in language and architecture prevented different functionalities from being reused from earlier contracts. Since the software was newly developed there remained a relatively high risk of failure in the software or its interfaces, therefore the new software required testing and packaging, adding to the cost of the contract. The application of a flexible framework of reusable and interchangeable components would enable a client to leverage earlier development investments and minimize risk of failure in the development process. Contractors would be able to provide clients with more accurate and lower bids and possibly prototypes or catalogues of products easily configured to the clients needs.

A similar, though different, architecture is SCA-Software communication architecture. This architecture is used in such applications as SDR (Software Defined Radio). SCA has specific interface description language (IDL) interfaces defined for software radios. Any new desired capabilities must fit in to pre defined IDL. SCA provides an interface framework; as such, it is not hardware independent. While peer-upper layer interfaces are well defined in SCA, lower layer interfaces are largely ignored. Another disadvantage of SCA for more general application is its total reliance on CORBA layered communications. Such problems present themselves in CPU overhead and quality of service. Messages can be delivered out of order and processed by different threads when belonging to the same data streams. Thus the SCA architecture is unsuitable for the distributed computing application.

Rocray et al. in a published US Application Pub. No. US 2002/0065958 A1 disclose a multiprocessor system that comprises a plurality of processor modules, including a software management processor, a non-volatile storage memory configuration (NVS), and a plurality of software components stored on the NVS configured for use in the processor modules. The application further discloses a software generic control information file used by the software management processor to relate the compatibility of software and to determine which of the software components to distribute to a processor module that requires software stored on the NVS.

In published PCT application, WO 02/057886 A2, Talk2 Technologies discloses methods, systems, and computer program products for dynamically accessing software components in an environment that may include a plurality of processing nodes. In the '886 reference, each node includes one or more software objects, such as one or more software component objects (virtual processors), a controller object, a database object, a trace object, an agent object, etc. Requests for the functionality implemented by a particular software component are load balanced across the available instances. If no software components are available, a request may be submitted to a scheduler. A software component also may be reserved for future processing. Relationships between software components are defined by platform independent logic that is accessible through a database object and processed by a controller object. An agent object tracks which software components are available at the one or more nodes for which the agent is responsible.

In order for such a component system to properly function a central infrastructure must provide a forum for this communication and synchronization for components and control the allocation of the tasks to the various components based on the capabilities and availabilities of those components, thereby preventing conflicts and redundancies.

Clearly what is needed to create a flexible framework of reusable and interchangeable components, developed and working independently, coordinated by controls that can be manipulated without substantial reengineering or programming in runtime.

SUMMARY OF THE INVENTION

The invention is devised in the light of the problems of the prior art described herein. Accordingly it is a general object of the present invention to provide a novel and useful technique that can solve the problems described herein.

One embodiment of the present invention provides a system for management of a distributed computing system including a tasking manager, whereby a plan is formulated describing a task to be carried out by the distributed computing system and detailing resources required for execution of the task a framework manager, communicating with the tasking manager and comprising at least one configuration manager, including a library within which are disposed at least one configuration template a means for ascertaining the current configuration of the distributed computing system a component assignment unit communicating with said tasking manager, the library, and the means for ascertaining the current configuration; and an output whereby the configuration manager directs the allocation of tasks to available system resources.

In such a system for management of a distributed computing system the configuration template may detail a tested configuration compliant with the distributed computing system and the component assignment unit may be configured to: compare said required resources with said each configuration template in said library to select usable configuration templates; compare said usable configuration templates with said means for ascertaining the current configuration; determine if system resources required by said usable templates are available; and select, based on comparisons of said usable templates with said current configuration, an optimal resource allocation for execution of said task.

According to one embodiment, system resources may include software processing units and hardware components. Such system resources may be adapted to RE (Radio Frequency) applications such as tuners, channelizers, transmission security components, delay/multi-band radios, modems, communication security components, and decoders.

A further embodiment of the present invention provides a configuration manager for the assignment of task elements to processing units in a component based distributed system, including a library wherein are disposed at least one configuration template; a means for ascertaining currently available system resources of the distributed computing system; a component assignment unit communicating with a tasking manager, the library, and the means for ascertaining currently available system resources; and means for communicating assignments of the task elements to the processing units.

In this embodiment, the component assignment unit may be configured to: compare said required resources with said each configuration template in said library to select usable configuration templates; compare the usable configuration templates with the means for ascertaining the current configuration; determine if system resources required by the usable templates are available; and select, based on comparisons of the usable templates with the current configuration, an optimal resource allocation for execution of the task.

According to one embodiment, system resources may include software processing units or hardware components. Such system resources may be adapted to RF applications, such as tuners, channelizers, transmission security components, delay/multi-band radios, modems, communication security components, and decoders.

Another embodiment of the present invention provides a method for the configuration of components in a component based distributed system including the steps of: obtaining a plan schematic; obtaining at least one configuration template from a configuration template library; matching the configuration template with system requirements defined by the plan schematic; generating a preliminary result from the step of comparing the system requirements with the configuration template; obtaining a current configuration of components in the component based distributed system describing currently available system resources; matching the current configuration with the preliminary result; generating a final result of the step of matching the current configuration and the preliminary result; and communicating the result to distributed processing centers.

According to one embodiment, configuration templates include tested configurations for the component based distributed system. The preliminary result may include a plurality of useable templates while the final result is an optimal configuration for the components given said current configuration of the system.

According to one embodiment of the present invention, the method is executed within a framework manager. A tasking engine may formulate the plan.

According to one embodiment of the invention, matching the current configuration with the preliminary result is undertaken so as to obtain a template with an optimal correlation between the requirements of the template and resources available to the system.

According to one embodiment of the present invention, components may include software processing units or hardware components. Such components may be adapted to RF applications Still other objects and advantages of the present invention will become readily apparent to those skilled in this art from the following detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings and exhibits, wherein like reference numerals designate like structural elements, and in which.

DETAILED DESCRIPTION OF THE PREFERRED EMBODIMENT

The deployment of components to solve a processing problem may be performed in two steps. The first describes what the elements are and the logical connection between them. The second step involves placing the components on processing elements such that the performance of all the components is guaranteed. This two-step technique allocates components to processing elements using a set of known working configurations that are described in a database. The algorithm queries each processing element for the template database and a set of rules that optimize the processor utilization and minimize the disruption to existing components.

One embodiment of the present invention is a component manager or engine integrated into a SIMPLE, script based, task engine. A user can input a plan of what components are necessary for a particular procedure via an application programming interface (API). Parameters for this can be set and controlled without changes being made to code. Such a script-based system requires little effort from the user to coordinate even complex tasks.

Figure 1:
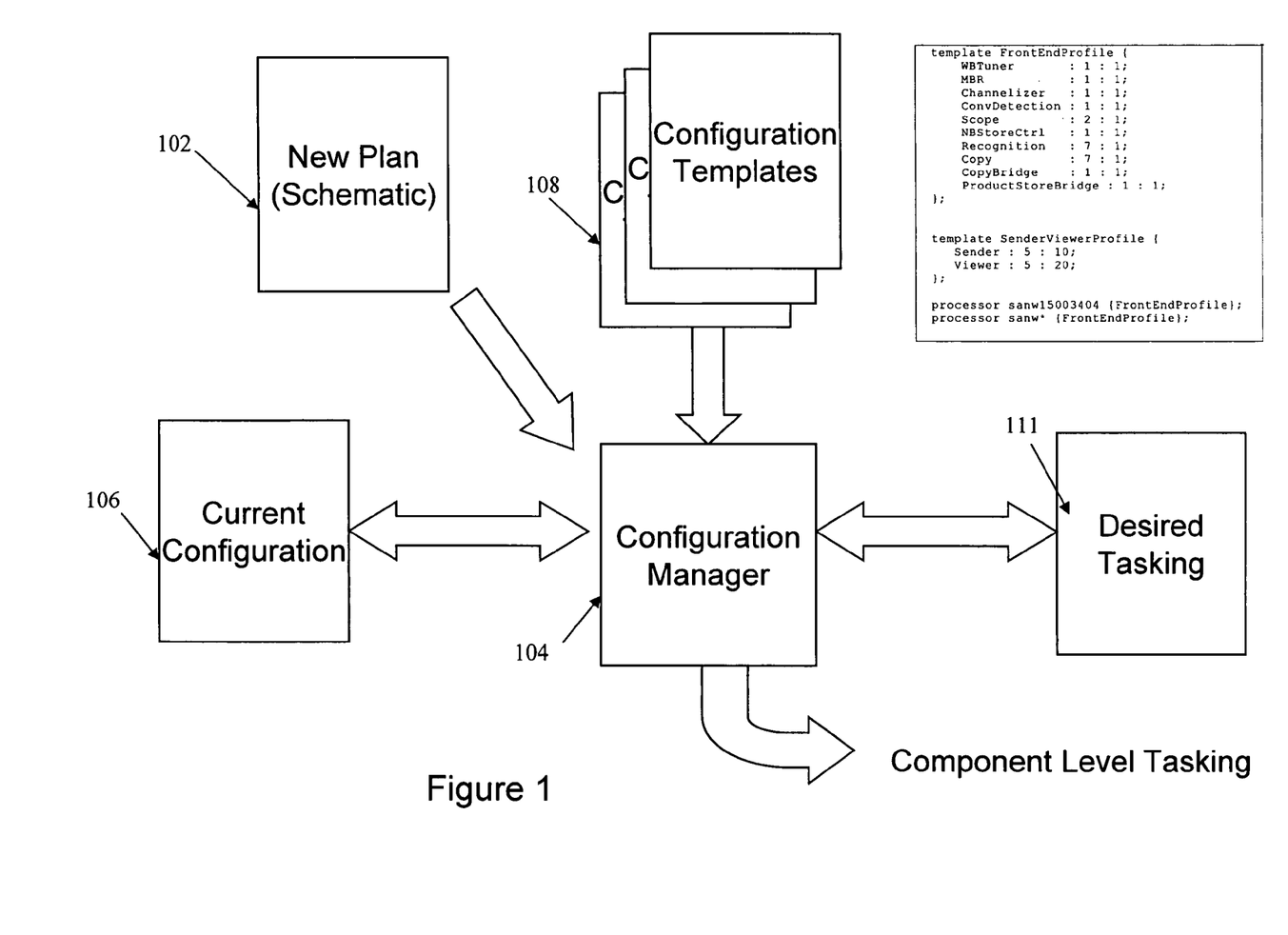
FIG. 1 is a flow chart of one embodiment of the present invention.

Referring to FIG. 1, this figure illustrates the operation of a configuration manager operating according to one embodiment of the present invention. The configuration manager or engine uses configuration templates to describe the possible combinations of processors capable of performing a particular function. These templates are stored in a database and are recalled by the configuration engine. The configuration engine maintains a current configuration of the system. The current configuration consists of a list of: the processors, of components running on each processor, current memory and CPU utilization of the processor, current interconnects between processors, and current loading of the processor.

This configuration is compiled dynamically at run time just before a new configuration is made. The configuration manager or engine is then able to compare the configuration template, the current configuration, and requirements of the task or schematic, inputted by the user and comprising: the list of components, the connections between each of the components and the component parameter values and other configuration information.

The configuration manager or engine then assigns the task to the processor best suited to its requirements and without conflicts and maintains a database of what components are loaded on which processors and monitors the processor loading (Memory, CPU and Input/Output bandwidth utilizations).

The configuration manager when assigning tasks to processors applies a component assignment algorithm designed to efficiently deploy components on as few processors as possible. Secondarily, the algorithm seeks to avoid disruption to currently executing plans or tasks. The algorithm avoids loading components until the optimal allocation is obtained. If the loading process fails, no assignments are actually made.

One embodiment of the present invention is best understood in the context of a Signal Intelligence/Information Warfare (SIGINT/IW) System, a component is an object-oriented set of reusable and new software, and if required compatible hardware, that performs a specific system task.

The present invention allows for the development and integration of custom object-oriented components that satisfy the assigned task(s) and are scaleable, modular, extensible, platform independent, open, robust, and efficient.

The general approach in this software development is to use object-oriented technology to model and build software, using the Unified Modeling Language (UML). This development technology utilizes the UML semantics and graphical notation to express the software design.

In one embodiment, the Rational Rose application is the primary UML tool used to specify, visualize, construct and document the elements and artifacts of a component consistent with the preferred embodiment of the present invention. Rational Rose is used to implement UML to create a blueprint or model for object-oriented system and software application construction.

An embodiment follows a set of standards to generate the object oriented design and software for the framework and components.

Once the component software model is reviewed, updated and stabilized the detailed lower level classes and internal sequences are coded to complete the component Visual C++ source code. The component source code is then compiled and tested.

Through the use of Object oriented technology, the component developer creates the application by extending the component base classes. Most methods of these classes have desired default behaviors, and need not be extended for simple applications. Component development can proceed in an iterative approach, with each iteration extending more and more of the classes and overwriting more and more of the base class methods, increasing the component maturity until the ultimate desired behavior and performance is attained.

A component, according to the present invention, interfaces and exists with a framework having been optimized for throughput, and will continue to have advances in performance with successive releases. The small penalty in run-time performance is greatly offset by the reduction in non-recurring engineering.

Architecture Overview

One embodiment of the present invention is an Information Dominance Systems product family for new SIGINT/IW Systems. The embodiment has a component-framework architecture that consists of a framework of expandable sets of reusable software components with compatible commercial, off the shelf (COTS) hardware. A framework makes components work together, provides a common run-time infrastructure for components, and provides a common set of base classes for component developers. One embodiment is an object-oriented system and software development approach for an evolving scaleable family of products. One embodiment is Operating System and platform independent in that the architecture is designed to run on PC WindowsNT, Sun Solaris, and embedded platforms such as VxWorks and MC/OS.

The preferred system provides a Product Store service, a repository for SIGINT products, accessible as either objects or as database entries. The system developer may extend the Product Store as required.

The component-framework architecture of the preferred embodiment provides common standard interfaces to the components. This facilitates testing at the component level. An embodiment of the present invention provides programmable component test capability. This capability consists of TestSource, a programmable signal and event source component, TestSink, a controllable signal and event logging and display component, and the MAUI (Maintenance And User Interface), which provides a graphical user interface into the component interfaces of individual components, processors, plans, and systems.

The architecture of the preferred embodiment of the present invention is component framework architecture. Components "Do the work" of the application. A component encapsulates the signal and data processing inside common (extensible) interface. Frameworks make components work together. The framework provides a common upgradeable run-time infrastructure for components and provides a common set of base classes for component developers.

Framework Manager

Based on the mission, priority, and component requirements a dynamic plan is constructed, by a tasking engine, to accomplish the individual component task(s). The tasking engine issues instructions to a framework manager. The framework manager manages the deployment of components to remote processors through a processor manager. The framework manager contains, in the preferred embodiment, a configuration manger. Some components may be capable of running some tasks, incapable of running others and capable of running still others yet with sub-optimal results. Components may already be assigned tasks, and have insufficient capacity remaining to execute additional tasks. The configuration manager seeks to rectify this. The configuration engine gathers information stored in a configuration template associated with each of the components, interrogates the processors about their current status and compares the results to the dynamic plan developed by a tasking engine. The configuration engine then assigns tasks to processor managers based on the results obtained. Thus an optimum allocation of resources is achieved even before a task is assigned to a processor or component. The framework manager then no longer is in direct control of the task, leaving the management thereof to the processor manager.

Processor Manager

The processor manager is application independent. A processor manager is associated with one or more specific components. It takes commands from the framework manager and manages the operation of components local to the processor.

Component(s)

Each component manages its local transforms and its associated I/Os. Component interaction is fully decoupled from other components. Any component interaction is managed by the Framework Manager and an associated Processor Manager. Some components such as Channelize, Detect, Copy, and Recognize are application independent.

Framework

The framework manages the deployment of components to processors in the system. The framework handles the management of interconnection of components. The deployment and interconnection of components may be done individually, or through the submission of a plan, containing this information.

Task applications provide translation of system operator or user required services to plans, component deployments, and component parameter settings. This includes copy (providing a software radio), search (a SIGINT signal acquisition and recognition system), and others. These task applications are extensible by system developers.

Components

Components are essentially small subsystems, with common interface characteristics and expected (control) behavior. By using Object-Oriented technology, these common interfaces and behaviors can be provided to the developer and enforced through inheritance. The component encapsulates the signal and data processing inside a common interface. The framework provides deployment, communications, and health monitoring services to the components.

The interfaces and expected (control) behaviors of components constant with the present invention are provided for the developer. The developer can focus his/her effort on the signal and data processing requirements of the component, and benefit by reusing the deployment, communications, and engineering services of the component base classes.

The component interface is designed not to be extended. The component base classes are extended "inside" the component. "Specific Interface" provides an interface extension mechanism for special cases.

A component implements a single function or small subsystem capability, for example, detection, base-band tuning, signal recognition, etc.

A component accepts input and produces output, generally in the form of signals (e.g. stream of complex floating point samples) or events (detection "alarms").

A component developer is generally unaware of the existence or behavior of other components. This frees the developer to solve the signal or data processing problem assigned, minimizing the development of interfaces and system level interactions. Interfaces and system level interactions consume most of the software and system development activity, while providing no perceived value to the customer.

A component is controlled using run-time discoverable parameter sets. These parameter sets are associated with both the component controller and the output ports. Applications external to the component may obtain the current parameter values and definitions, and may change the parameters of the component. The component is notified of changes and may behave as the developer programs it to.

A component is developed independent of the target processor platform. The component developer need not understand the details of the operating system or machine architecture to create functioning, high performance components.

The details of the operating system and target platform are insulated, as the developer uses an Operating System API for the services required. The developer typically uses a user-friendly development environment such as MicroSoft Visual C++ for initial code and debugging, and then rebuilds the component for the target.

Component Base Class Services

The Component Base Class provides the required services and interfaces for the component developer. These include:
Component
Provides all component services (through delegation)
Creation, destruction, stop, start, shutdown, provide ports, plots, identity
Control
Register for sending, receiving
Component Interface
Access to services to the specific component
Get output port and port info, set/get parameters, parameter change service, enable message logging, identity, statistics registry, send, get specific interface
InputPort
Input for signal and event data
Register, accept in (by type), identity, status, get input
OutputPort
Output for signal or event data
Send, identity, parameters of processing for this output, set/get type
Parameters
Self-Describing interface for control for processing, output ports, plots
Also used for other self-describing interfaces
Set, get, get definitions, verify, register for update
OSAPI
Operating System API
Time, time-related services, spawn, identity
PlotInterface
Graphical debug
Add, remove, get, set, get definition, set parameters, plotfx, plotxy, text, clear
Transform
Base class of one instance of signal processing
Accept signal or event, parameters, output control
Message Logging
Severity managed error logging
logMessage Setting up the Development Environment In an embodiment setting up the development environment is pre-requisite to component development and consists of the configuration of individual WindowsNT workstations connected to the developer's company LAN.

EXAMPLE OF WINDOWS NT WORKSTATION BASE CONFIGURATION

Microsoft Windows NT 4.0 with Service Pack 4 (or later)
Intel Pentium III 600 MHz Processor (512 cache)
Minimum configuration must include:
i. Intel Se440BX2 motherboard with Ultra ATA IDE, 440BX2 chip set,
ii. PCI bus, 3 dedicated PCI slots, 1 dedicated ISA slot, 1 shared
iii. ISA/PCI slot, AGP graphics slot
iv. 512M bytes ECC Memory (DIMM)
v. Western Digital 20 GB IDE hard drive AC28400
vi. 1.44 Mb 3½ floppy drive
vii. enhanced IDE CD drive
viii. Intel Pro/100 Plus Ethernet card
ix. Matrox G400 w/16 MB video card
x. Monitor 21" (Minimum recommended resolution 1600× 1200)
xi. 320 Sound Card
xii. PS2 104 key Keyboard
xiii. Microsoft PS2 IntelliMouse FIG. 1 is a block diagram of elements of a framework manager 100 configured according to one embodiment of the present invention. A tasking engine provides a new plan or schematic 102. The plan details the components and their connections, but does not assign processors. The configuration manager or engine 104 is in charge of assigning components to processors. To do this the configuration manager 104 first inspects the plan or schematic 102 looking for unallocated components. If all components are allocated, it then checks to see is each component is capable of running on the processor for which they have been configured.

The configuration manager 104 queries each process manager looking for components that have already been loaded. It constructs a database 106 for each processor containing a list of those components already loaded. This database 106 contains the current configuration of the system.

The configuration template then loads the template database or library 108. The template library is compared with the plan, and those templates that provide viable configurations are collected. These viable templates are then compared with the current configuration. The configuration manger 104 is configured to minimize the resources dedicated to a particular component. Thus the optimal assignment is one that minimizes the number of processors devoted to a particular component.

The configuration manager 104 assigns components first to empty processors, then to partially full processors. The configuration manager then updates the template library 108, including the new configuration as a template.

If the component is successfully loaded onto its assigned processor, the processor manager sends a success message back to the configuration manger 104. If it fails to load, the configuration manger is alerted to the error.

Figure 2:
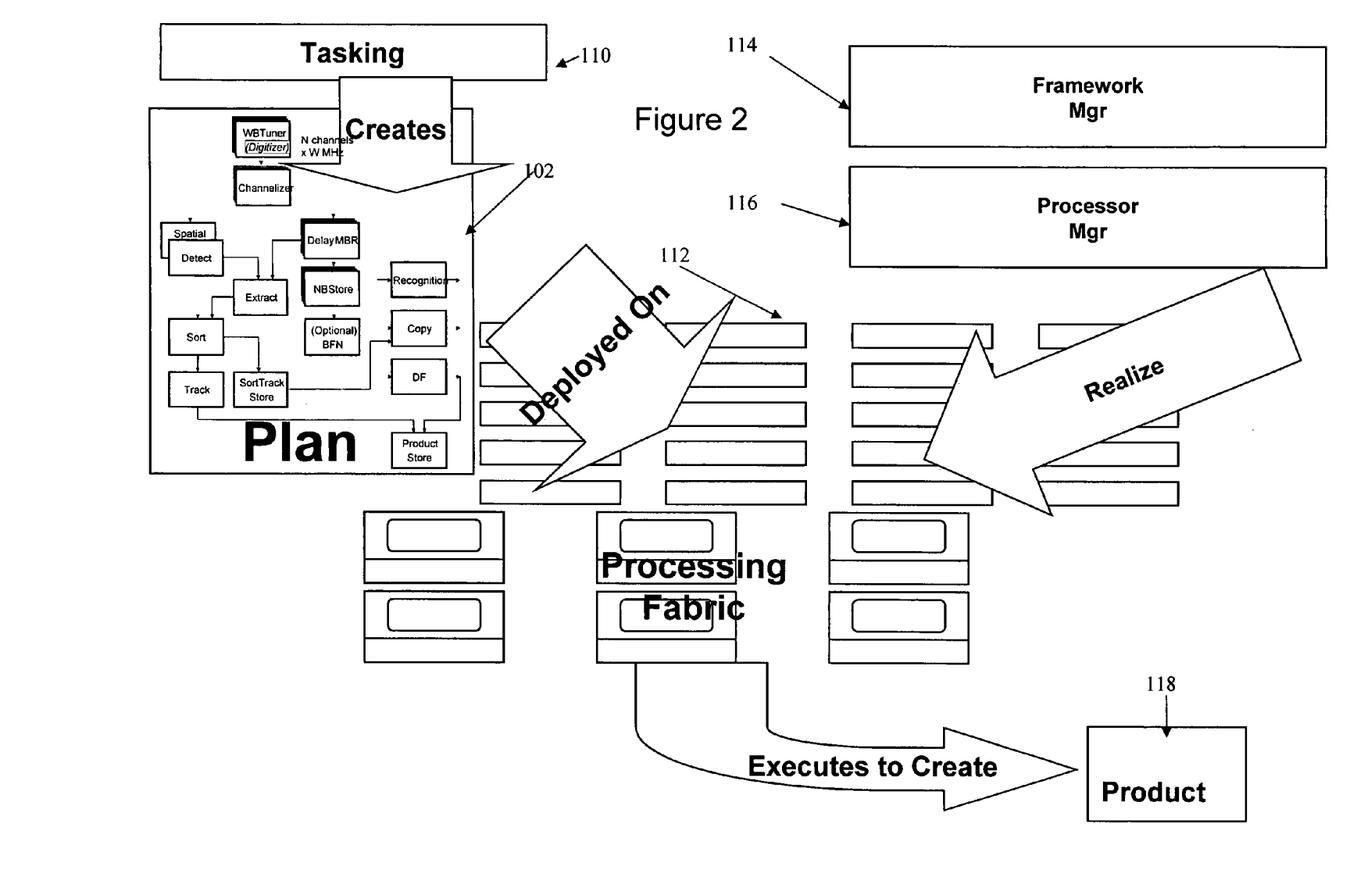
FIG. 2 is a flow chart of the tasking process utilizing one embodiment of the present invention.

Referring now to FIG. 2, which is a block diagram of the tasking/configuration process constructed according to one embodiment of the present invention. The plan 102, formulated by a tasking engine 110 is deployed on a fabric of processor units 112. This is realized through the framework manager 114 acting through the processor manager(s) 116. The processors then execute the plan 102, thereby creating the product 118.

Figure 3:
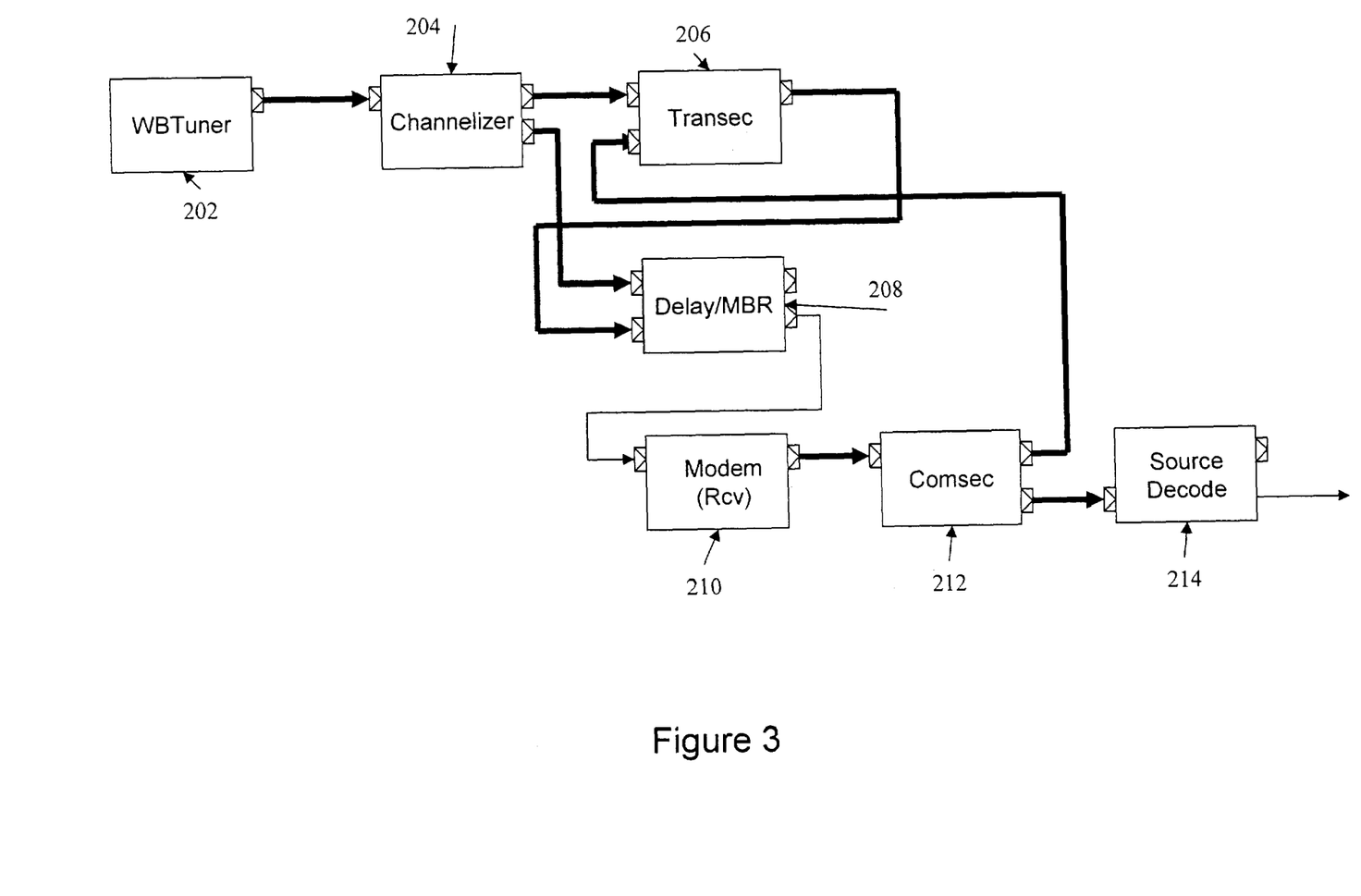
FIG. 3 is a flow chart of a sample plan constructed by a tasking engine within a framework implementing one embodiment of the present invention.

FIG. 3 illustrates one possible plan characteristic of an RF (radio frequency) application configured according to one embodiment of the present invention. A Wide band tuner 202 is coupled with a channelizer 204 which is in turn connected to both a Transec 206, a transmission security component that enables switching between radio frequencies to prevent electronic eavesdropping, and a delay/multi-band radio 208, which is connected to a modem 210, which is connected to a Comsec 212, a communications security component, such as an encryption unit, which is linked to both the Transec 206 and to a decoder 214.

Figure 4:
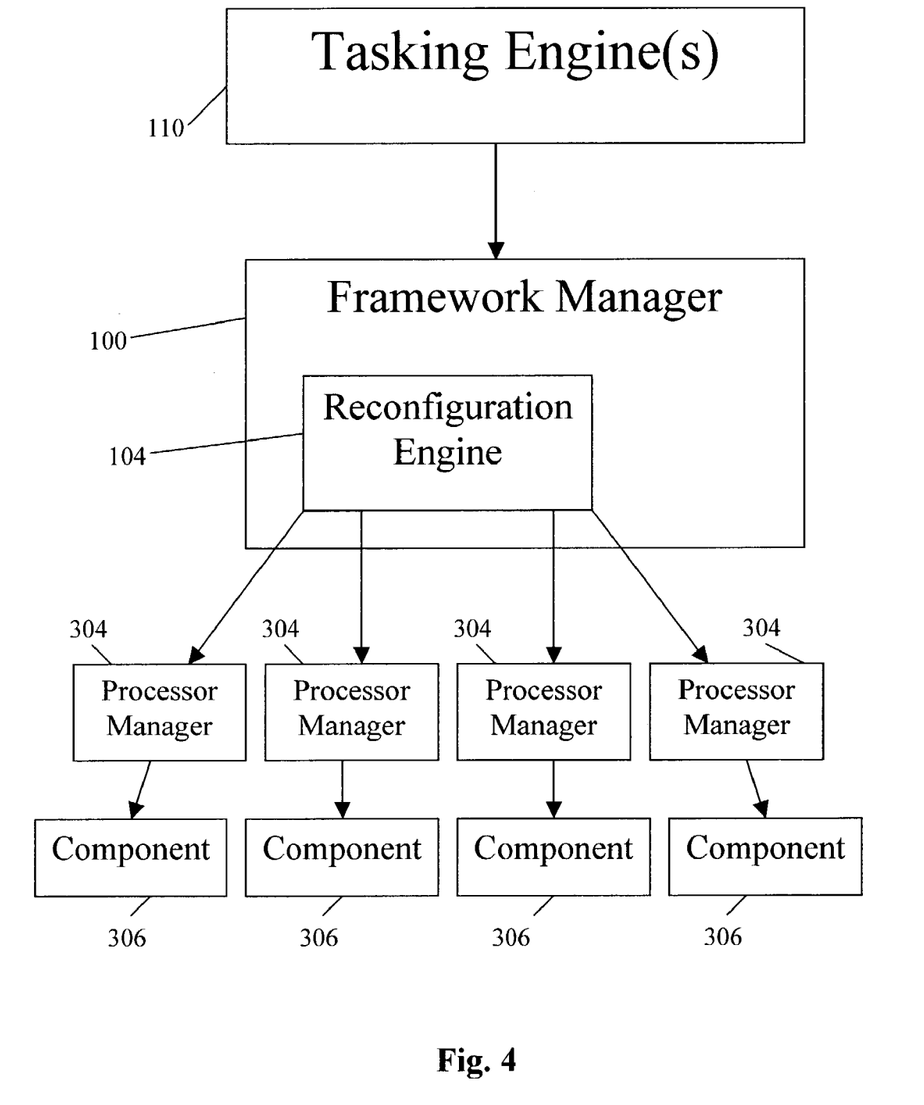
FIG. 4 is a flow chart of one embodiment of the present invention and its relationship to components and client processors.

FIG. 4 is a flow chart of one embodiment of the present invention and its relationship to components and client processors. The tasking engine 110 assigns tasks to the framework engine 100, an element of which is a configuration/reconfiguration engine 104. The configuration engine 104 then assigns elements of the plan to processing managers 304 associated with components 306.

Figure 5:
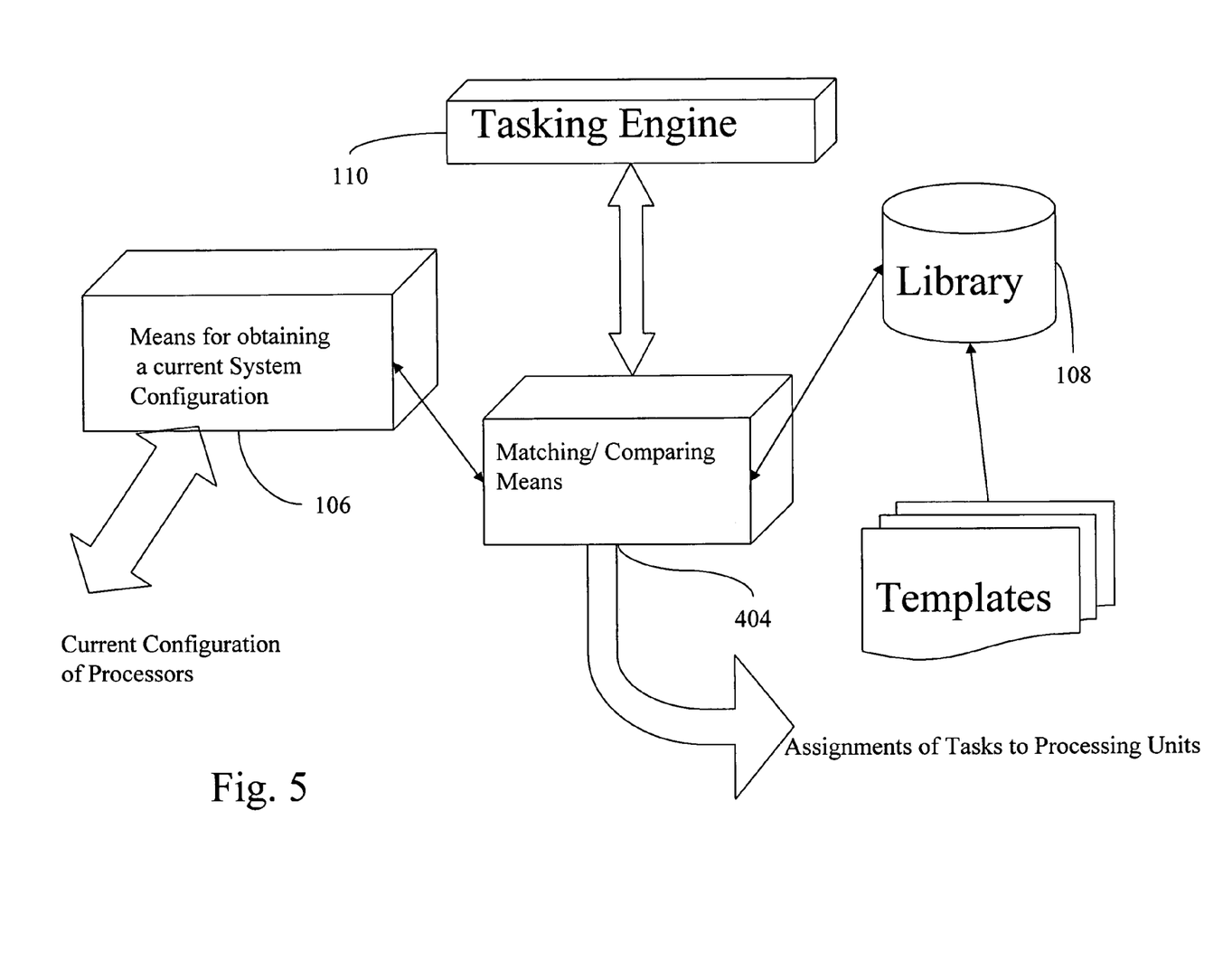
FIG. 5 is a block diagram of the configuration manager according to one embodiment of the present invention.

FIG. 5 is a block diagram of the configuration manager according to one embodiment of the present invention. The tasking engine 110 provides a dynamic plan to the matching comparing means 404 that compares that plan with the resources available to it, as listed in the current system configuration 106 with pre-tested templates stored in a library 108. The matching comparing means then assigns the task to available processors in such a way as to minimize demands on the system.

Figure 6:
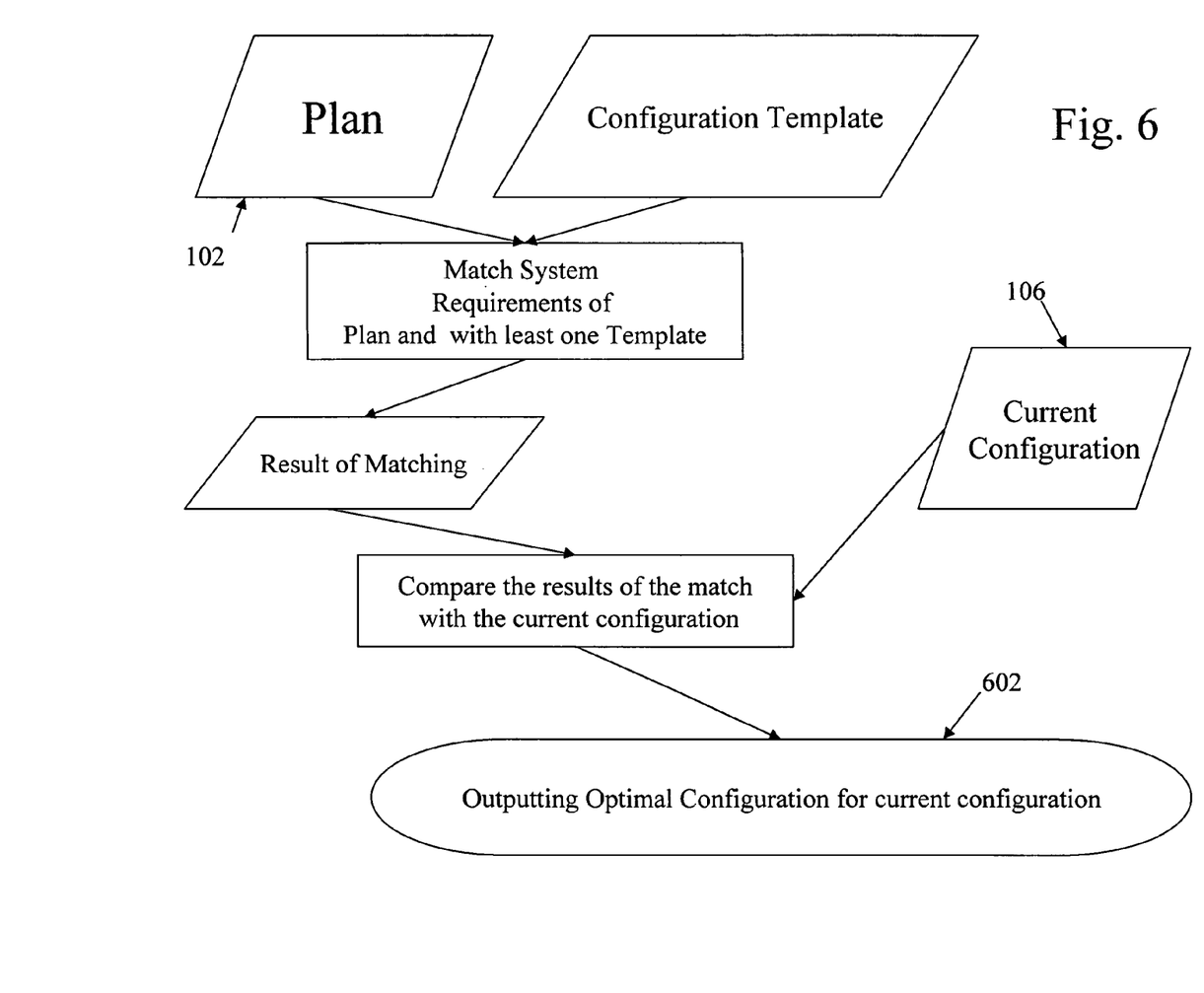
FIG. 6 is a follow chart illustrating the steps in the configuration method according to one embodiment of the present invention.

FIG. 6 is a flow chart illustrating the steps in the configuration method according to one embodiment of the present invention. A plan or schematic 102 is matched with at least one template having the same or similar system requirements. The results of this match are then compared with the current configuration 106 to see is the necessary processors are available to execute the chosen templates. The best templates are those that minimize demands on system resources. The optimal solution 602 is then used to configure the system and assign tasks to processors.

One embodiment of the present invention system for management of a distributed computing system including a tasking manager, whereby a plan is formulated describing a task to be carried out by the distributed computing system and detailing resources required for execution of the task a framework manager, communicating with the tasking manager and comprising at least one configuration manager, including a library within which are disposed at least one configuration template a means for ascertaining the current configuration of the distributed computing system a component assignment unit communicating with said tasking manager, the library, and the means for ascertaining the current configuration; and an output whereby the configuration manager directs the allocation of tasks to available system resources.

In such a system for management of a distributed computing system the configuration template may detail a tested configuration compliant with the distributed computing system and the component assignment unit may be configured to: compare said required resources with said each configuration template in said library to select usable configuration templates; compare said usable configuration templates with said means for ascertaining the current configuration; determine if system resources required by said usable templates are available; and select, based on comparisons of said usable templates with said current configuration, an optimal resource allocation for execution of said task.

According to one embodiment, system resources may include software processing units and hardware components. Such system resources may be adapted to RF applications such as tuners, channelizers, transmission security components, delay/multi-band radios, modems, communication security components, and decoders.

One embodiment of the present invention is a configuration manager for the assignment of task elements to processing units in a component based distributed system, including a library wherein are disposed at least one configuration template; a means for ascertaining currently available system resources of the distributed computing system; a component assignment unit communicating with a tasking manager, the library, and the means for ascertaining currently available system resources; and means for communicating assignments of the task elements to the processing units.

In this embodiment, the component assignment unit may be configured to: compare said required resources with said each configuration template in said library to select usable configuration templates; compare the usable configuration templates with the means for ascertaining the current configuration; determine if system resources required by the usable templates are available; and select, based on comparisons of the usable templates with the current configuration, an optimal resource allocation for execution of the task.

According to one embodiment, system resources may include software processing units or hardware components. Such system resources may be adapted to RF applications, such as tuners, channelizers, transmission security components, delay/multi-band radios, modems, communication security components, and decoders.

One embodiment of the present invention is a method for the configuration of components in a component based distributed system including the steps of: obtaining a plan schematic; obtaining at least one configuration template from a configuration template library; matching the configuration template with system requirements defined by the plan schematic; generating a preliminary result from the step of comparing the system requirements with the configuration template; obtaining a current configuration of components in the component based distributed system describing currently available system resources; matching the current configuration with the preliminary result; generating a final result of the step of matching the current configuration and the preliminary result; and communicating the result to distributed processing centers.

According to one embodiment, configuration templates include tested configurations for the component based distributed system. The preliminary result may include a plurality of useable templates while the final result is an optimal configuration for the components given said current configuration of the system.

According to one embodiment of the present invention, the method is executed within a framework manager. A tasking engine may formulate the plan.

According to one embodiment of the invention, matching the current configuration with the preliminary result is undertaken so as to obtain a template with an optimal correlation between the requirements of the template and resources available to the system.

According to one embodiment of the present invention, components may include software processing units or hardware components. Such components may be adapted to RF applications.

Included herein as Appendix A, are portions of source code that describe one embodiment of the invention. Those skilled in the art readily appreciate that the functionality expressed therein is not limited by the literal expression of the code and that there are numerous equivalent manners to present the functions. The comments and source code depict a single embodiment of the present invention.

Numerous characteristics and advantages have been set forth in the foregoing description, together with details of structures and functions of a configuration engine, and the novel features thereof are pointed out in appended claims. The disclosure, however, is illustrative only, and changes may be made in arrangement and details, within the principle of the invention, to the full extent indicated by the broad general meaning of the terms in which the appended claims are expressed.

The objects and advantages of the invention may be further realized and attained by means of the instrumentalities and combinations particularly pointed out in the appended claims. Accordingly, the drawing and description are to be regarded as illustrative in nature, and not as restrictive.

I claim:

1. A method for the configuration of components in a component based distributed system, the method comprising:
obtaining a plan schematic;

obtaining at least one system configuration template, said at least one system configuration template from a configuration template library, wherein said system configuration template describes a combination of components, said combination of components having been tested to ensure usability in the system and that the combination of components is capable of performing a desired function;

matching said at least one system configuration template with system requirements defined by said plan schematic;

generating a preliminary result from said comparing said system requirements with said system configuration template;

obtaining a current configuration of components in said component based distributed system describing currently available system resources;

matching said current configuration with said preliminary result;

generating a final result of the matching said current configuration and said preliminary result by selecting a system configuration template which minimizes disruption to said components while running and minimizes demands on the currently available system resources; and communicating said final result to said component based distributed system.

2. The method for the configuration of components in a component based distributed system according to claim 1 wherein said preliminary result comprises a plurality of useable system configuration templates.

3. The method for the configuration of components in a component based distributed system according to claim 1 wherein said final result is an optimal configuration for said components given said current configuration of said system.

4. The method for the configuration of components in a component based distributed system according to claim 1 wherein said method is executed within a framework manager.

5. The method for the configuration of components in a component based distributed processor system according to claim 4 wherein said plan is formulated by a tasking engine.

6. The method for the configuration of components in a component based distributed processor system according to claim 1 wherein matching said current configuration with said preliminary result is undertaken so as to obtain a template with an optimal correlation between the requirements of the template and resources available to said system.

7. The method for the configuration of components in a component based distributed processor system according to claim 1 wherein said components comprise software processing units.

8. The method for the configuration of components in a component based distributed processor system according to claim 1 wherein said components comprise hardware components.

9. The method for the configuration of components in a component based distributed processor system according to claim 1 wherein said components are adapted to RF applications.

10. The method for the configuration of components in a component based distributed processor system according to claim 1 wherein said components comprise at least one of components consisting of tuners, channelizers, transmission security components, delay/multi-band radios, modems, communication security components, or decoders.

11. A system for management of a distributed computing system, said system for management being stored in a storage memory and comprising:
    a task manager, whereby a plan is formulated describing a task to be carried out by said distributed computing system and detailing system resources required for execution of said task;
    a framework manager, communicating with said task manager and comprising;
        at least one configuration manager, comprising;
            a library wherein are disposed at least one tested system configuration template, said tested system configuration template comprising possible combinations of processing units tested to ensure usability in the system;
            a means for ascertaining a current configuration of said distributed computing system as a whole;
            a component assignment unit configured to provide a desired or guaranteed performance of a desired function by said system configured according to said tested system configuration template and communicating with said task manager, said library, and said means for ascertaining the current configuration; and
    an output whereby said at least one configuration manager directs the allocation of task components to available known system resources.

12. The system for management of a distributed computing system of claim 11 wherein each said tested system configuration template details a tested configuration compliant with said distributed computing system.

13. The system for management of a distributed computing system of claim 11 wherein said component assignment unit is configured to:
    compare said required system resources with said each configuration template in said library to select usable tested system configuration templates;
    compare said usable configuration templates with said means for ascertaining the current configuration;
    determine if system resources required by said usable tested system configuration templates are available; and
    select, based on comparisons of said usable templates with said current configuration, an optimal system resource allocation for execution of said task.

14. The system for management of a distributed computing system according to claim 11 wherein said system resources comprise software processing units.

15. The system for management of a distributed computing system according to claim 11 wherein said system resources comprise hardware components.

16. The system for management of a distributed computing system according to claim 11 wherein said system resources are adapted to RF (Radio Frequency) applications.

17. The system for management of a distributed computing system according to claim 11 wherein said system resources comprise at least one of resources consisting of tuners, channelizers, transmission security components, delay/multi-band radios, modems, communication security components, or decoders.

18. A configuration manager stored in a storage memory for the assignment of task elements of an application to processing units in a component based distributed system, comprising;
    a library wherein are disposed at least one tested system configuration template, said at least one tested system configuration template comprising possible combinations of processing units tested to ensure usability in the system;

a means for ascertaining currently available system resources of said distributed computing system;

a component assignment unit configured to provide a desired or guaranteed performance of a desired function by said component based distributed system configured according to said tested system configuration template and communicating with a task manager, said library, and said means for ascertaining currently available system resources; and means for communicating assignments of said task elements to said processing units.

19. The configuration manager according to claim 18 wherein said component assignment unit is configured to:

compare said required system resources with said the at least one tested system configuration template in said library to select usable tested system configuration templates;

compare said usable tested system configuration templates with said means for ascertaining the current configuration;

determine if system resources required by said usable tested system configuration templates are available; and select, based on comparisons of said usable tested system configuration templates with said current configuration, an optimal system resource allocation for execution of said task.

20. The configuration manager according to claim 18 wherein said system resources comprise software processing units.

21. The configuration manager according to claim 18 wherein said system resources comprise hardware components.

22. The configuration manager according to claim 18 wherein said system resources are adapted to RF applications.

23. The configuration manager according to claim 18 wherein said system resources comprise at least one of resources consisting of tuners, channelizers, transmission security components, delay/multi-band radios, modems, communication security components, or decoders.

24. A system for management of a distributed computing system, said system for management being stored in a storage memory and comprising:

a task manager means, for communicating with said distributed computing system, and capable of communicating a plan describing the tasks to be carried out by said distributed computing system and said plan detailing system resources assigned for execution of said tasks;

a framework manager means, for communicating with said task manager means and comprising:

at least one configuration manager means, comprising:

a library containing at least one tested system configuration template, said tested system configuration template comprising possible combinations of processor units tested to ensure usability in the system;

a component configuration engine, in communication with each of the available known system resources of the distributed computing system, configured to ascertain a current configuration of said distributed computing system as a whole;

a component assignment unit, in communication with said task manager means, said library, and said component configuration engine, said component assignment unit configured to generate said plan; and an output configured to communicate tasks assigned by said plan to the available known system resources.

25. A configuration manager stored in a non-transitory storage medium for the assignment of task elements of an application to processing units in a component based distributed system, the configuration manager comprising:

a library software component containing at least one tested system configuration template, said at least one tested system configuration templates comprising possible combinations of processing units tested to ensure usability in the system;

a component configuration software component in communication with each of the available known processing units of the distributed computing system, configured to ascertain a current configuration of said distributed computing system as a whole;

a component assignment software component, in communication with said library software component and said component configuration software component, said component assignment software component configured to generate assignments of said task elements to said processing units; and an assignment software component, in communication with each of said processing units and configured to communicate assignments of said task elements to said processing units.

26. A non-transitory storage computer-readable medium having stored thereon, computer-executable instructions that, if executed by a computing device, cause the computing device to perform a method comprising:

obtaining a plan schematic;

obtaining at least one system configuration template from a configuration template library, wherein said at least one system configuration template describes a combination of processing units, said combination of processing units having been tested to ensure usability in the system and that the processing units are each capable of performing a desired function;

matching said at least one system configuration template with system requirements defined by said plan schematic;

generating a preliminary result from said matching said system requirements with said system configuration template;

obtaining a current configuration of said component based distributed system describing currently available system resources;

matching said current configuration with said preliminary result;

generating a final result of the step of matching said current configuration and said preliminary result by selecting a system configuration template which minimizes disruption to said components while running and minimizes demands on the currently available system resources; and communicating said final result to said component based distributed system.

* * * * *